(12) United States Patent
Serizawa et al.

(10) Patent No.: US 10,583,614 B2
(45) Date of Patent: Mar. 10, 2020

(54) METHOD FOR MANUFACTURING PLASTIC SINTERED BODY, METAL MOLD, AND PLASTIC SINTERED BODY

(71) Applicant: ENPLAS CORPORATION, Saitama (JP)

(72) Inventors: Kei Serizawa, Saitama (JP); Koji Noguchi, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 204 days.

(21) Appl. No.: 15/319,574

(22) PCT Filed: May 25, 2015

(86) PCT No.: PCT/JP2015/064870
§ 371 (c)(1),
(2) Date: Dec. 16, 2016

(87) PCT Pub. No.: WO2015/194318
PCT Pub. Date: Dec. 23, 2015

(65) Prior Publication Data
US 2017/0120540 A1 May 4, 2017

(30) Foreign Application Priority Data
Jun. 19, 2014 (JP) .................................. 2014-125873

(51) Int. Cl.
*B29C 67/20* (2006.01)
*B29C 43/36* (2006.01)
(Continued)

(52) U.S. Cl.
CPC ............ *B29C 67/205* (2013.01); *B29C 43/36* (2013.01); *B29C 67/04* (2013.01);
(Continued)

(58) Field of Classification Search
USPC ....... 264/48, 112, 113, 120; 55/523, DIG. 5; 210/338, 497.01; 29/896.62
See application file for complete search history.

(56) References Cited

U.S. PATENT DOCUMENTS 4,351,869 A * 9/1982 Cresap .................. B29C 43/006
264/314
5,707,718 A * 1/1998 Matsukawa ........... F16C 17/026
428/218
(Continued)

FOREIGN PATENT DOCUMENTS

JP 60-122710 7/1985
JP 61-188129 8/1986
(Continued)

OTHER PUBLICATIONS

International Search Report dated Aug. 11, 2015 in International (PCT) Application No. PCT/JP2015/064870.

*Primary Examiner* — Matthew J Daniels
*Assistant Examiner* — Mohammad M Ameen
(74) *Attorney, Agent, or Firm* — Wenderoth, Lind & Ponack, L.L.P.

(57) ABSTRACT

A plastic sintered body has a first compressed portion formed by heating plastic powder packed in a cavity of a metal mold and sintering a first portion of the plastic powder packed in the cavity in a first compression state. In addition, a second compressed portion is formed by sintering a second portion of the plastic powder packed in the cavity in a second compression state. A plurality of interconnected minute voids are formed in the first compressed portion and a plurality of interconnected minute voids smaller than the voids in the first compressed portion are formed in the second compressed portion. The manufacturing of the plastic sintered body as noted above is performed continuously in the metal mold. In addition, two types of porous portions (Continued)

including voids of different sizes are formed by sintering only one type of the plastic powder in the metal mold.

7 Claims, 4 Drawing Sheets

(51) Int. Cl.
*B29C 67/04* (2017.01)
*B29K 105/04* (2006.01)
*B29L 31/14* (2006.01)

(52) U.S. Cl.
CPC ...... *B29K 2105/04* (2013.01); *B29K 2905/00* (2013.01); *B29L 2031/14* (2013.01)

(56) References Cited

U.S. PATENT DOCUMENTS

2003/0134100 A1* 7/2003 Mao .................. A61L 27/34
428/304.4
2004/0168973 A1* 9/2004 Hughes .............. B01D 39/1653
210/502.1

FOREIGN PATENT DOCUMENTS

| JP | 61-188130 | * | 8/1986 |
| JP | 9-313834 | | 12/1997 |
| JP | 2008-221611 | | 9/2008 |

* cited by examiner

METHOD FOR MANUFACTURING PLASTIC SINTERED BODY, METAL MOLD, AND PLASTIC SINTERED BODY

TECHNICAL FIELD

The present invention relates to a method for manufacturing a plastic sintered body by sintering plastic powder in a metal mold, a metal mold used for the manufacturing method, and a plastic sintered body.

BACKGROUND ART

A plastic sintered body that has been conventionally used as a filter, silencing body, or the like is a porous body formed by packing plastic powder into the cavity of a metal mold, heating the metal mold at a temperature close to the melting point of the plastic powder, welding adjacent particles of the plastic powder, and cooling the metal mold. The plastic sintered body has contiguous voids through which gas or liquid passes.

FIGS. 4A-4C illustrate a conventional method for manufacturing a two-layer plastic sintered body 100. The two-layer plastic sintered body 100 illustrated in FIGS. 4A-4C is formed by the first and second sintering processes. In the first sintering process, as illustrated in FIG. 4A, the first plastic powder is packed in a cylindrical cavity 102 of a first metal mold 101 and an opening 103 of the cavity 102 is covered with a lid (not illustrated), the first metal mold 101 is put in a heating furnace heated to a temperature close to the melting point of the first plastic powder, and the entire first metal mold 101 is heated in the heating furnace for 20 to 30 minutes to sinter the first plastic powder in the cavity 102. As a result, a cylindrical first plastic sintered body 104 is formed. In the first plastic sintered body 104, interconnected minute voids are formed between particles of the first plastic powder.

In addition, in the second sintering process, as illustrated in FIG. 4B, the first plastic sintered body 104 is accommodated in a second metal mold 105, the second plastic powder having a particle size different from that of the first plastic powder is packed in a cylindrical cavity 106 of the second metal mold 105 formed on the radially outer side of the first plastic sintered body 104, an opening 107 of the cavity 106 is covered with a lid (not illustrated), the second metal mold 105 is put in the heating furnace heated to a temperature close to the melting point of the second plastic powder, the entire second metal mold 105 is heated in the heating furnace for 20 to 30 minutes to sinter the second plastic powder in the cavity 106. As a result, a cylindrical second plastic sintered body 108 is integrally formed without any space on the outer circumferential side of the first plastic sintered body 104, and the two-layer plastic sintered body 100 including the first plastic sintered body 104 and the second plastic sintered body 108 is formed (see FIG. 4C). In the two-layer plastic sintered body 100, the first plastic sintered body 104 includes voids having a size different from that of the second plastic sintered body 108 (see JP-A-2008-221611).

However, in the method for manufacturing the conventional two-layer plastic sintered body 100 illustrated in FIGS. 4A-4C, since a plurality of metal molds (the first metal mold 101 and the second metal mold 105) corresponding to the sintering processes are necessary and these metal molds need to be input to or output from the furnace for each of the plurality of sintering processes, the cost of metal molds becomes high and the number of manufacturing man-hours increases. In addition, in the method for manufacturing the conventional plastic sintered body 100 illustrated in FIGS. 4A-4C, since a plurality of types of plastic powder having different particle sizes need to be prepared and the plastic powder with a difference particle size needs to be selectively used for each of the sintering processes, the manufacturing work becomes complicated.

An object of the invention is to provide a method for manufacturing a plastic sintered body, metal mold, and plastic sintered body that can reduce the cost of the metal molds and the number of manufacturing man-hours and simplify the manufacturing work.

SUMMARY OF THE INVENTION

The invention relates to a method for manufacturing a plastic sintered body 1 in which a lot of interconnected minute voids are formed by heating and sintering plastic powder 5 packed in a cavity 7 of a metal mold 6. The method for manufacturing the plastic sintered body 1 according to the invention forms a first compressed portion by sintering a first portion of the plastic powder 5 packed in the cavity 7 in a first compression state. In addition, the method forms a second compressed portion by sintering a second portion of the plastic powder 5 packed in the cavity 7 in a second compression state. The voids in the second compressed portion are smaller than the voids in the first compressed portion.

Advantageous Effects of Invention

Since such manufacturing work of a metal plastic sintered body can be performed continuously in a single metal mold in the invention, the cost of the metal mold and manufacturing man-hours can be reduced. In addition, since two types of porous portions having voids of different sizes are formed by sintering only one type of plastic powder in the metal mold in the invention, manufacturing work is simplified as compared with conventional examples in which the plastic powder with a difference particle size needs to be selectively used for each sintering process.

BRIEF DESCRIPTION OF DRAWINGS

FIGS. 1A-1C illustrate the plastic sintered body according to a first embodiment of the invention, in which FIG. 1A is a front view illustrating the plastic sintered body, FIG. 1B is a cross sectional view taken along line A1-A1 in FIG. 1A, FIG. 1C is a rear view illustrating the plastic sintered body.

FIGS. 2A-2C illustrate the structure in which the plastic sintered body according to the first embodiment of the invention is used as a filter, in which FIG. 2A is a side view illustrating the filter in which an upstream chamber is cut, FIG. 2B is a front view illustrating the filter, and FIG. 2C is a cross sectional view taken along line A2-A2 in FIG. 2A.

FIGS. 3A-3C illustrate a method for manufacturing the plastic sintered body and a metal mold according to the first embodiment of the invention, in which FIG. 3A illustrates the structure of the metal mold before the plastic powder is packed in a cavity, FIG. 3B illustrates the state after the plastic powder is packed in the cavity of the metal mold until the plastic powder in the cavity is heated and pressurized, and FIG. 3C illustrates the state in which the plastic powder packed in the cavity of the metal mold is being heated and pressurized.

FIGS. 4A-4C illustrate a method for manufacturing the conventional plastic sintered body and the plastic sintered body manufactured by the manufacturing method, in which FIG. 4A illustrates a first sintering process of the conventional plastic sintered body, FIG. 4B illustrates a second sintering process of the conventional plastic sintered body, and FIG. 4C illustrates the conventional plastic sintered body.

DETAILED DESCRIPTION OF THE INVENTION

Figure 1A:
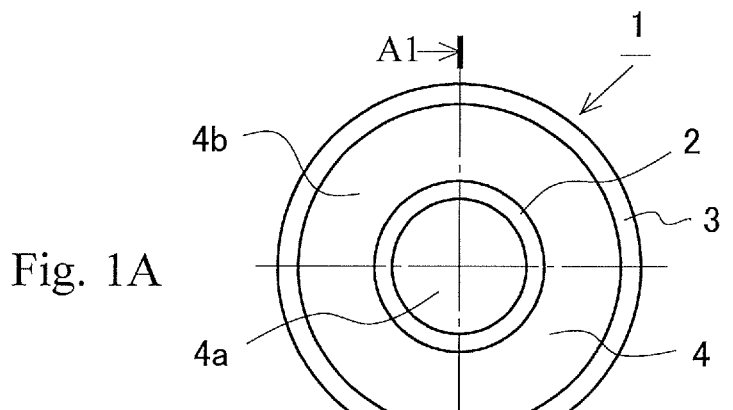
Figure 1B:
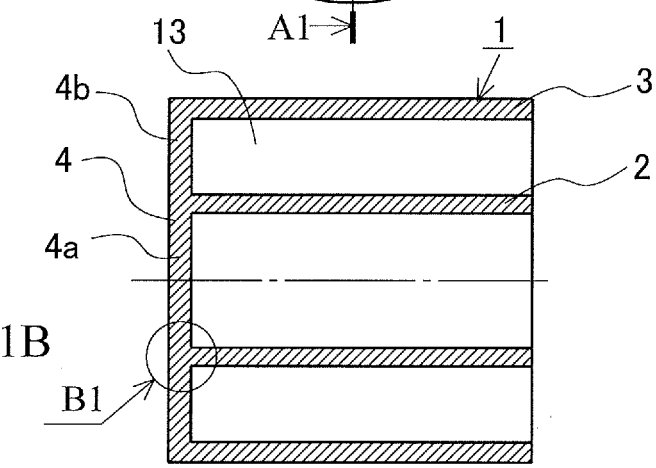
Figure 1D:
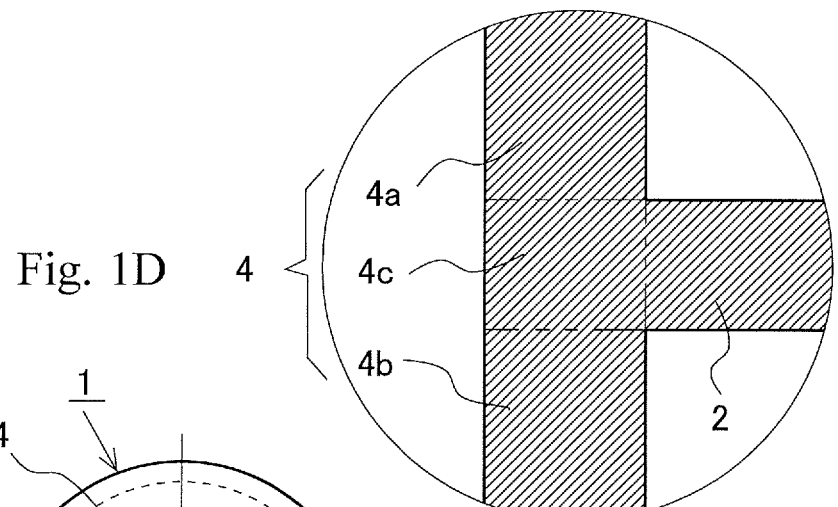
FIG. 1D is an enlarged view illustrating section B1 in FIG. 1B.
Figure 1C:
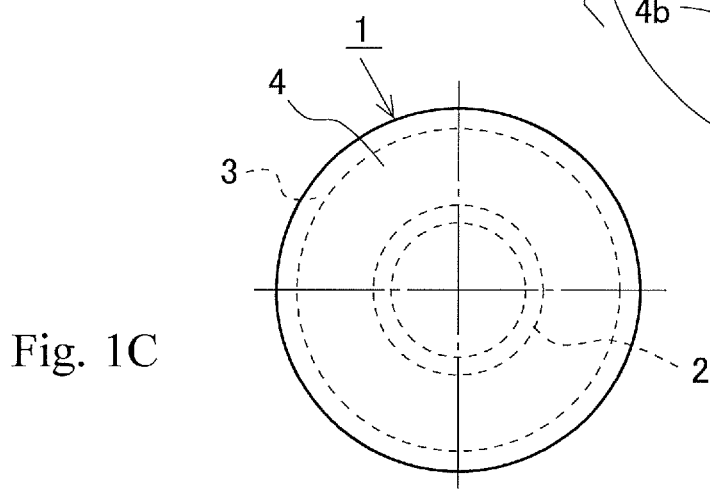

Embodiments of the invention will be described in detail with reference to the drawings.

First Embodiment (Plastic Sintered Body)

FIG. 1 illustrates the plastic sintered body 1 according to the first embodiment of the invention. FIG. 1A is a front view illustrating the plastic sintered body 1, FIG. 1B is a cross sectional view illustrating the plastic sintered body 1 taken along line A1-A1 in FIG. 1A, FIG. 1C is a rear view illustrating the plastic sintered body 1, and FIG. 1D is an enlarged view illustrating section B1 in FIG. 1B.

As illustrated in FIG. 1, in the plastic sintered body 1, an inner cylinder 2 and an outer cylinder 3 are disposed concentrically and spaced apart in the radial direction such that an annular space is formed between the inner cylinder 2 and the outer cylinder 3. One axial end of the inner cylinder 2 and one end of the outer cylinder 3 are blocked by a bottom plate 4. The plastic sintered body 1 is sintered by heating and pressurizing one type of the plastic powder 5 selected from polyethylene, polypropylene, polystyrene, polymethylmethacrylate, polyamide, and the like in the metal mold 6, and has a shape obtained by transferring the shape of the cavity 7 of the metal mold 6 as shown in FIG. 3. The bottom plate 4 of the plastic sintered body 1 has the first bottom plate portion 4a, which is the bottom plate portion closing the end of the inner cylinder 2, and the second bottom plate portion 4b, which is the bottom plate portion closing the end of the annular space between the inner cylinder 2 and the outer cylinder 3. In addition, the first bottom plate portion 4a and the second bottom plate portion 4b are connected to each other via a connection portion 4c (portion surrounded by the chain double-dashed line in FIG. 1D). The outer cylinder 3 and the second bottom plate portion 4b (first portion) of the plastic sintered body 1 are sintered by an internal pressure (first compression state) applied by the thermal expansion (during heating) of the plastic powder 5 itself packed in the cavity 7 without being pressurized from the outside and the porous portion (first compressed portion) is formed. In this porous portion, fluid (gas and liquid) can pass through interconnected minute voids between particles of the plastic powder 5. In addition, the inner cylinder 2 and the connection portion 4c (second portion) are porous portions (second compressed portion) sintered in the state (second compression state) in which they are pressurized from the outside in addition to the internal pressure equal to the first compression state, in which the size of interconnected minute voids between particles of the plastic powder 5 is smaller than that of the outer cylinder 3 and the second bottom plate portion 4b (first portion), but fluid (gas and liquid) can pass through the voids. In addition, since the first bottom plate portion 4a (third portion) is sintered in the state (third compression state) in which the first bottom plate portion 4a is pressurized by a pressure larger than the external pressure in the above second compression state, particles of the plastic powder 5 are welded to each other and interconnected minute voids are not formed between particles of the plastic powder 5 to form a fluid blocking area (third compressed portion) through which fluid (gas and liquid) cannot pass. The case in which interconnected minute voids are not formed includes the case in which minute voids are not formed and the case in which non-interconnected minute voids are formed.

Figure 2A:
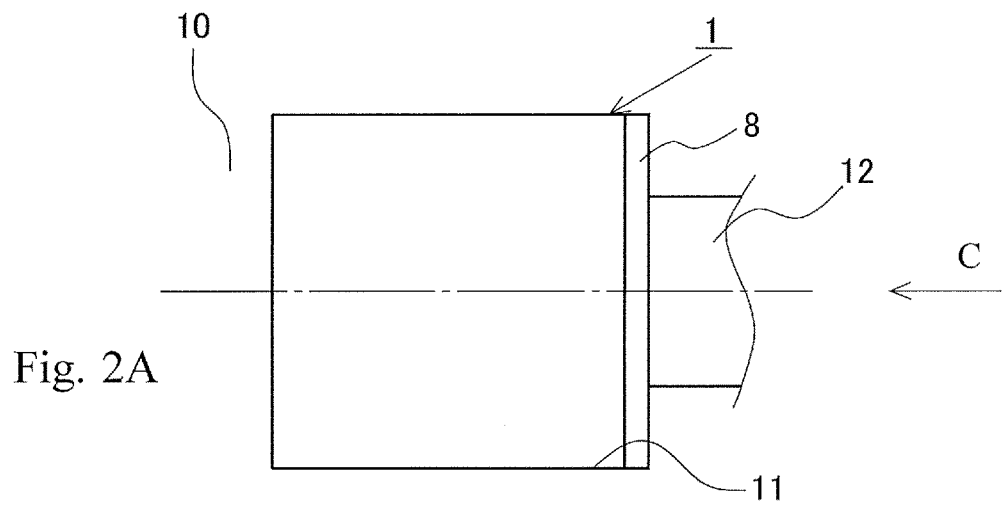
Figure 2B:
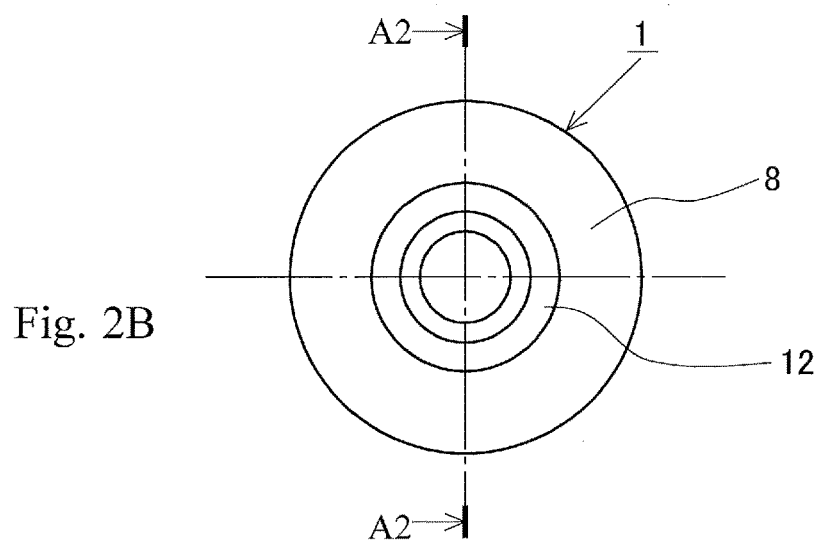
Figure 2C:
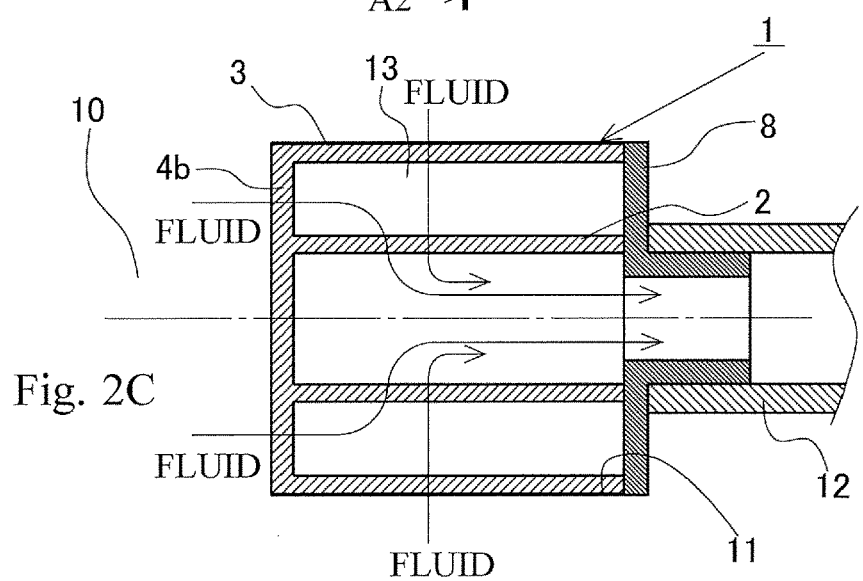

As illustrated in FIG. 2, when the plastic sintered body 1 is used as a filter, the opening between the inner cylinder 2 and the outer cylinder 3 is blocked by a lid member 8 shaped like a hollow disc, and the opening of the lid member 8 is connected to a downstream side conduit 12. The plastic sintered body 1 used as a filter can filter out relatively large foreign matters (foreign matters that can be caught by the interconnected voids in the outer cylinder 3 and the second bottom plate portion 4b) included in fluid using the outer cylinder 3 and the second bottom plate portion 4b when the fluid on an upstream side 10 passes through the outer cylinder 3 and the second bottom plate portion 4b and flows into an annular space 13 between the outer cylinder 3 and the inner cylinder 2. In addition, the plastic sintered body 1 used as a filter can filter out relatively small foreign matters (foreign matters, smaller than the interconnected voids in the outer cylinder 3 and the second bottom plate portion 4b, that can be caught by the interconnected voids in the inner cylinder 2) when the fluid having flowed into the space 13 between the outer cylinder 3 and the inner cylinder 2 flows into the inside of the inner cylinder 2 through the inner cylinder 2. The relatively small foreign matters filtered out by the void openings of the inner cylinder 2 close to the outer cylinder 3 are stored in the space 13 between the inner cylinder 2 and the outer cylinder 3.

Figure 4A:
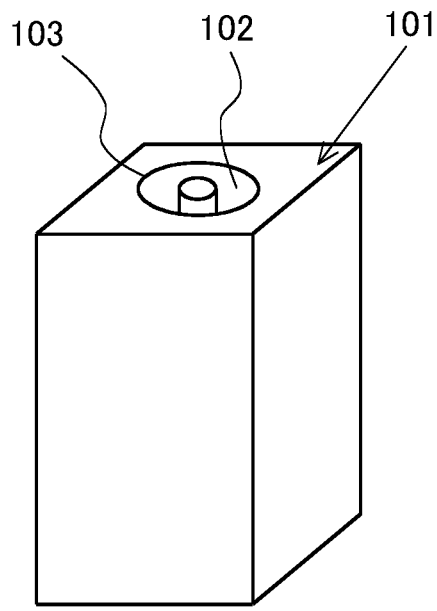
Figure 4B:
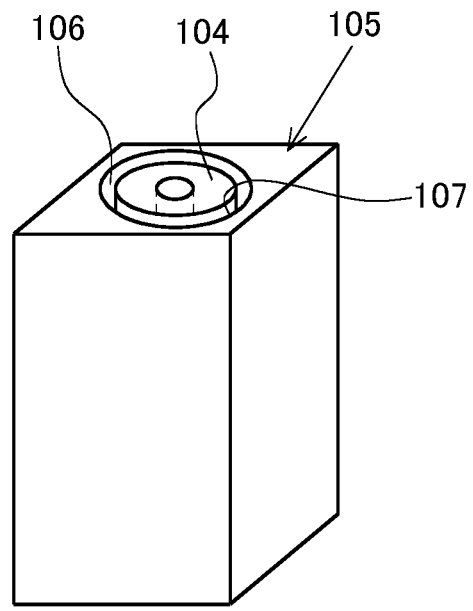
Figure 4C:
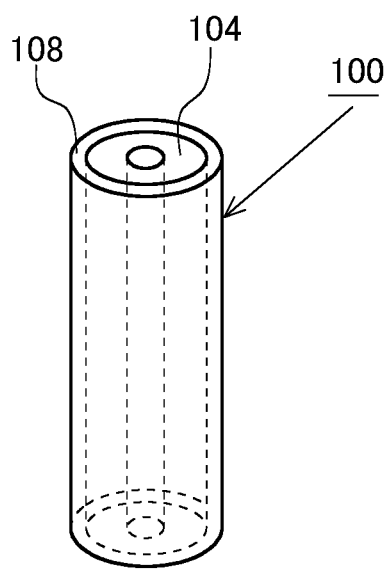

As described above, when the plastic sintered body 1 according to the embodiment is used as a filter, the plastic sintered body 1 can filter out foreign matters in the fluid in two stages (the outer cylinder 3, the second bottom plate portion 4b, and the inner cylinder 2) based on their sizes. In addition, when the plastic sintered body 1 according to the embodiment is used as a filter, since the foreign matters filtered out can be stored in the space 13 between the outer cylinder 3 and the inner cylinder 2, it is possible to prevent clogging from being caused by the foreign matters filtered out by the interconnected minute voids in the inner cylinder 2 for a long period of time. Accordingly, when the plastic sintered body 1 according to the embodiment is used as a filter, desired filter performance can be maintained for a long period of time. In contrast, when the conventional two-layer plastic sintered body 100 illustrated in FIG. 4 is used as a filter, since no room is formed between the first plastic sintered body 104 and the second plastic sintered body 108, there is no sufficient space for accommodating the foreign matters in the fluid (gas or liquid) filtered out by the border between the first plastic sintered body 104 and the second plastic sintered body 108. As a result, when the conventional plastic sintered body 100 is used as a filter, clogging may be caused early.

The pressure in the first compression state in the invention is not limited to the internal pressure applied by thermal expansion of the plastic powder 5 itself packed in the cavity 7 during heating, and may be an external pressure as in the second and third compression states in the range in which voids in the second compression portion are smaller than voids in the first compression portion. This increases the flexibility of the size of voids in the first compression state and increases variations of filters to which the invention is applied.

In addition, the third compressed portion in the invention is not limited to the implementation (implementation for blocking fluid) in which interconnected minute voids are not formed between particles of the plastic powder 5, voids in the third compressed portion may be smaller than voids in the second compressed portion, and interconnected minute voids may be formed between particles of the plastic powder 5. In such a configuration, by adjusting voids in the third compressed portion, it is possible to form a filter having the same filtering performance of voids in the first compressed portion and voids in the second compressed portion and provide a filter having a service life longer than the filter according to the above embodiment.

In the invention, voids in the third compressed portion may be the same as voids in the second compressed portion. In such a configuration, the filter performance of the third compressed portion is similar to that of the second compressed portion, so a filter having a surface area larger than the above embodiment can be provided.

In addition, the one type of the plastic powder 5 in the invention is not limited to powder having a single material and a single particle diameter and may be, for example, a uniform mixture of a plurality of types of powder having a single material and two or more particle diameters. The powder having a single particle diameter is the plastic powder 5 having particle diameters within a predetermined variation.

In addition, the one type of the plastic powder 5 in the invention may be a uniform mixture of a plurality of types of powder having a plurality of materials and a single particle diameter.

In addition, the one type of the plastic powder 5 in the invention may be a uniform mixture of a plurality of types of powder having a plurality of materials and two or more particle diameters.

(Method for Manufacturing a Plastic Sintered Body and a Metal Mold)

Figure 3A:
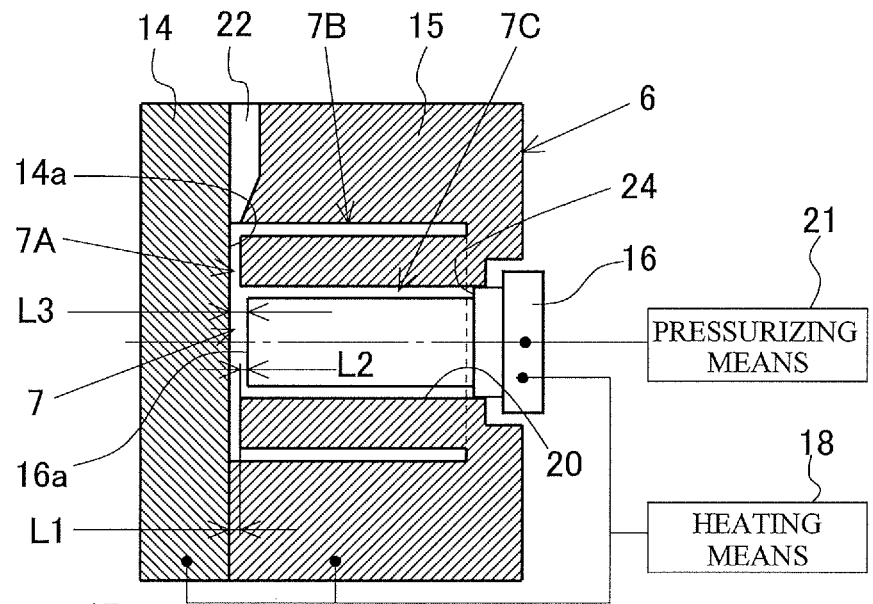
Figure 3B:
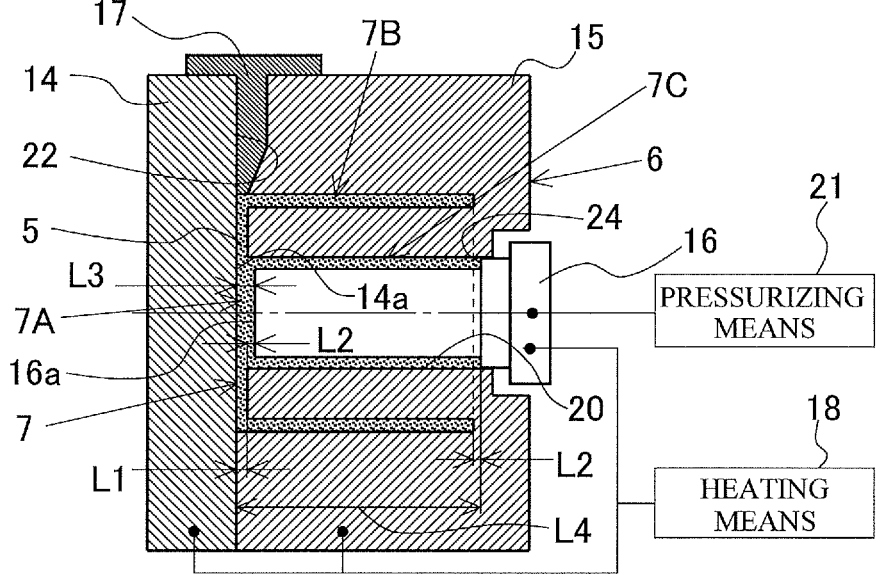
Figure 3C:
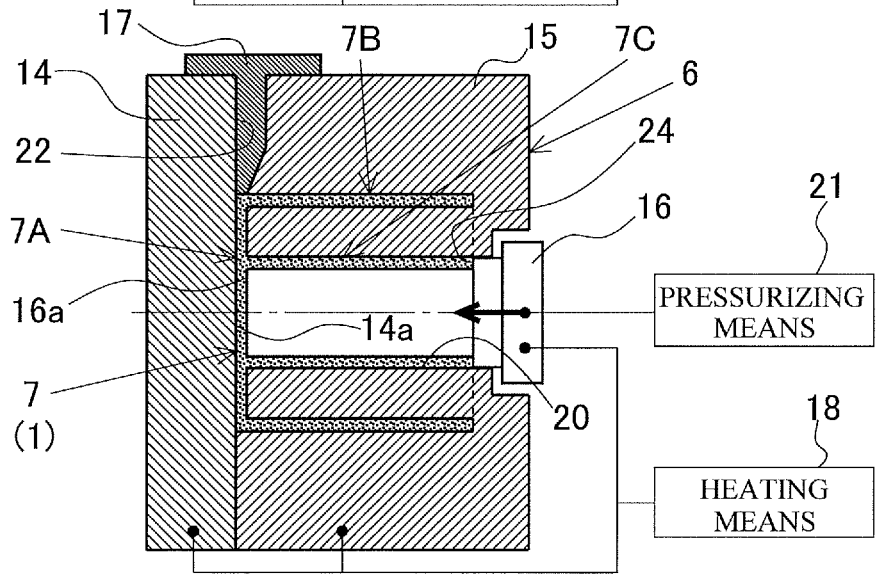

FIG. 3 illustrates a method for manufacturing the plastic sintered body 1 and the metal mold 6 according to the embodiment. FIG. 3A illustrates the state (first manufacturing step) before the plastic powder 5 is packed in the cavity 7 of the metal mold 6. In addition, FIG. 3B illustrates the state (second manufacturing step) after the plastic powder 5 is packed in the cavity 7 of the metal mold 6 until the plastic powder 5 in the cavity 7 is heated and pressurized. In addition, FIG. 3C illustrates the state in which the plastic powder 5 packed in the cavity 7 of the metal mold 6 is being heated and pressurized.

As illustrated in FIG. 3, the metal mold 6 used to manufacture the plastic sintered body 1 includes the first metal mold 14, the second metal mold 15, a pressurizing movable mold 16, and a packing hole sealing member 17. In the metal mold 6, a first cavity part 7A of the cavity 7 is formed in the contact part between the first metal mold 14 and the second metal mold 15, a second cavity part 7B of the cavity 7 is formed in the second metal mold 15, the third cavity part 7C of the cavity 7 is formed in the engagement part between the second metal mold 15 and the pressurizing movable mold 16. The first metal mold 14, the second metal mold 15, and the pressurizing movable mold 16 are heated by a heater as heating means 18 so that the plastic powder 5 in the cavity 7 can be heated to a temperature at which the plastic powder 5 can be sintered. In addition, the pressurizing movable mold 16 is slidably fitted into a movable fitting hole 20 of the second metal mold 15 and connected to pressurizing means (pressurizer) 21, so that the plastic powder 5 in the cavity 7 can be compressed by changing the capacity of the cavity 7. In addition, the packing hole sealing member 17 is removed from a packing hole 22 of the metal mold 6 when the plastic powder 5 is packed into the cavity 7 of the metal mold 6, fitted into the packing hole 22 of the metal mold 6 after the plastic powder 5 is packed into the cavity 7 of the metal mold 6, and detachably fixed to the metal mold 6 by fixing means (not illustrated). In addition, in the cavity 7, the first cavity part 7A mainly forms the bottom plate 4 of the plastic sintered body 1, the second cavity part 7B forms the outer cylinder 3 of the plastic sintered body 1, and the third cavity part 7C forms the inner cylinder 2 of the plastic sintered body 1.

First, in the first manufacturing step illustrated in FIG. 3A, the packing hole sealing member 17 of the metal mold 6 is removed from the packing hole 22 before the plastic powder 5 is packed into the cavity 7. In addition, in the pressurizing movable mold 16 of the metal mold 6, when the compression amount of the plastic powder 5 packed into the first cavity part 7A and the third cavity part 7C is assumed to be L2 with respect to the clearance (L1) of the first cavity part 7A, an end surface 16a is held at the position (retraction position) away from a first metal mold side cavity inner surface 14a by L3 (L3=L1+L2).

Next, in the second manufacturing step illustrated in FIG. 3B, after one type of the plastic powder 5 is packed into the cavity 7 through the packing hole 22 of the metal mold 6, the packing hole sealing member 17 is fitted into the packing hole 22 and the packing hole 22 is sealed with the packing hole sealing member 17 to prevent the plastic powder 5 packed into the cavity 7 from leaking from the metal mold 6.

Next, in the third manufacturing process illustrated in FIG. 3C, the first metal mold 14, the second metal mold 15, and the pressurizing movable mold 16 are heated by a heater as the heating means 18 to a desired temperature exceeding the melting point of the plastic powder 5. After the first metal mold 14, the second metal mold 15, and the pressurizing movable mold 16 are heated to the desired temperature and kept for a certain period of time, the pressurizing movable mold 16 is pushed into the movable fitting hole 20 by a predetermined amount (the compression amount L2 of the plastic powder 5) by the pressurizing means (pressurizer) 21, the plastic powder 5 between the end surface 16a (the first depressing part) of the pressurizing movable mold 16 and the first metal mold side cavity inner surface 14a is compressed by L2 by the end surface 16a of the pressurizing movable mold 16, and the plastic powder 5 in the third cavity part 7C is compressed by L2 by a flange end surface 24 (second depressing part) of the pressurizing movable mold 16. When compression is completed, energization to the heater as the heating means 18 is interrupted, the first metal mold 14, the second metal mold 15, and the pressurizing movable mold 16 are cooled for a certain period of time, the plastic powder 5 in the cavity 7 is sintered, and the plastic sintered body 1 illustrated in FIG. 1 is formed. When the plastic sintered body 1 in the cavity 7 is further cooled, the first metal mold 14 is separated from the second metal mold 15 and the plastic sintered body 1 is removed from the cavity 7 of the metal mold 6.

In the plastic sintered body 1 manufactured as described above, the compression ratio ($\alpha 1 = L2/L3$) of the plastic powder 5 between the end surface 16a (first depressing part) of the pressurizing movable mold 16 and the first metal mold side cavity inner surface 14a can be set larger ($\alpha 1 > \alpha 2$) than the compression ratio α2 (α2=L2/L4 when the dimension from the flange end surface 24 of the pressurizing movable mold 16 to the first metal mold side cavity inner surface 14a is L4) of the plastic powder 5 between the flange end surface 24 (second depressing part) of the pressurizing movable mold 16 and the first metal mold side cavity inner surface 14a. As a result, since the first bottom plate portion 4a (the third portion positioned between the end surface 16a (first depressing part) of the pressurizing movable mold 16 and the first metal mold side cavity inner surface 14a) of the plastic sintered body 1 is sintered in the state (third compression state) in which the first bottom plate portion 4a is directly pressurized by the pressurizing movable mold 16, particles of the plastic powder are welded to each other to prevent the passage of fluid (gas and liquid) to form a fluid blocking area (third compressed portion) that prevents the passage of fluid (gas and liquid). In addition, the outer cylinder 3 of the plastic sintered body 1 and the second bottom plate portion 4b (first portion) are porous portions (first porous portion and also the first compressed portion) sintered and formed by the internal pressure (first compression state) applied by the thermal expansion of the plastic powder 5 itself packed in the cavity 7 during heating without being directly pressurized by the pressurizing movable mold 16, the interconnected minute voids between particles of the plastic powder 5 is larger than in other parts so that fluid (gas and liquid) can pass through the voids. In addition, in the plastic sintered body 1, the connection portion 4c between the first bottom plate portion 4a and the second bottom plate portion 4b and the inner cylinder 2 (second portion positioned between the flange end surface 24 (second depressing part) of the pressurizing movable mold 16 and the first metal mold side cavity inner surface 14a) are porous portions (second porous portion and also second compressed portion) sintered and formed in the state (second compression state) in which direct pressurization is made by the pressurizing movable mold 16. Although the size of interconnected minute voids between particles of the plastic powder 5 is smaller than in the outer cylinder 3 and the second bottom plate portion 4b, fluid (gas and liquid) can pass through the voids. Accordingly, the plastic sintered body 1 manufactured by the method for manufacturing the plastic sintered body 1 according to the embodiment can filter out foreign matters in fluid in two stages based on their sizes when the plastic sintered body 1 is used as a filter.

As described above, since the manufacturing work of the plastic sintered body 1 can be performed continuously in a single metal mold 6 in the method for manufacturing the plastic sintered body 1 according to the embodiment, the cost of the metal mold and manufacturing man-hours can be reduced. In addition, in the method for manufacturing the plastic sintered body 1 according to the embodiment, since two types of porous portions having voids of different sizes are formed by sintering only one type of the plastic powder 5 in the metal mold 6, manufacturing work is simplified as compared with conventional examples in which the plastic powder 5 with a different particle size needs to be selectively used for each sintering process.

Other Embodiments

Although the plastic sintered bodies 1 according to the first and second embodiments are used as filters, the invention is not limited to the embodiments and the plastic sintered body 1 may also be used as a silencer.

In addition, although the inner cylinder 2 and the outer cylinder 3 are formed in a cylindrical shape with a circular cross-section in the plastic sintered body 1 according to the first embodiment, the invention is not limited to the embodiment. The inner cylinder 2 and the outer cylinder 3 may be formed in a width across flat shape, a polygonal shape (for example, rectangle or hexagon), or the like. In addition, although the inner cylinder is formed in a cylindrical shape with a circular cross-section in the plastic sintered body 1 according to the second embodiment, the invention is not limited to the embodiment and the inner cylinder may be formed in a width across flat shape, a polygonal shape, or the like.

REFERENCE SIGNS LIST

1: plastic sintered body
5: plastic powder
6: metal mold
7: cavity

The invention claimed is:

1. A method of manufacturing a plastic sintered body in which interconnected voids are formed by heating and sintering plastic powder packed in a cavity of a metal mold, the method comprising:
   providing the metal mold having the cavity shaped such that the plastic sintered body formed therein has an outer cylinder, an inner cylinder located inside the outer cylinder, and a bottom plate closing an end of the outer cylinder and the inner cylinder, the bottom plate having:
      a first bottom plate portion closing the end of the inner cylinder;
      a second bottom plate portion closing an end of an annular space between the outer cylinder and the inner cylinder; and
      a connection portion connecting the first bottom plate portion and the second bottom plate portion;
   packing the plastic powder into the cavity of the metal mold;
   forming the outer cylinder and the second bottom plate portion by sintering a first portion of the plastic powder packed in the cavity in a first compression state, the first compression state comprising pressurizing the first portion of the plastic powder with an internal pressure applied due to thermal expansion of the plastic powder; and
   forming the inner cylinder and the connection portion by sintering a second portion of the plastic powder packed in the cavity in a second compression state, the second compression state comprising pressurizing the second portion of the plastic powder with the internal pressure applied due to thermal expansion of the plastic powder and external pressure applied to the second portion of the plastic powder such that a pressure of the second compression state is greater than a pressure of the first compression state,
   wherein said forming the outer cylinder and the second bottom plate portion, and said forming the inner cylinder and the connection portion are performed such that voids in the inner cylinder and the connection portion are smaller than voids in the outer cylinder and the second bottom plate portion.

2. A method of manufacturing a plastic sintered body by heating and sintering plastic powder packed in a cavity of a metal mold, the method comprising:
   providing the metal mold having the cavity shaped such that the plastic sintered body formed therein has an outer cylinder, an inner cylinder located inside the outer cylinder, and a bottom plate closing an end of the outer cylinder and the inner cylinder, the bottom plate having:
- a first bottom plate portion closing the end of the inner cylinder;
- a second bottom plate portion closing an end of an annular space between the outer cylinder and the inner cylinder; and
- a connection portion connecting the first bottom plate portion and the second bottom plate portion;

packing the plastic powder into the cavity of the metal mold;

forming the outer cylinder and the second bottom plate portion by sintering a first portion of the plastic powder packed in the cavity in a first compression state, the first compression state comprising pressurizing the first portion of the plastic powder with an internal pressure applied due to thermal expansion of the plastic powder;

forming the inner cylinder and the connection portion by sintering a second portion of the plastic powder packed in the cavity in a second compression state, the second compression state comprising pressurizing the second portion of the plastic powder with the internal pressure applied due to thermal expansion of the plastic powder and external pressure applied to the second portion of the plastic powder such that a pressure of the second compression state is greater than a pressure of the first compression state; and forming the first bottom plate by sintering a third portion of the plastic powder packed in the cavity in a third compression state, the third compression state comprising pressurizing the third portion of the plastic powder with the internal pressure applied due to thermal expansion of the plastic powder and external pressure applied to the third portion of the plastic powder, the external pressure applied to the third portion being greater than the external pressure applied to the second portion such that a pressure of the third compression state is greater than a pressure of the second compression state, wherein said forming the outer cylinder and the second bottom plate portion is performed such that interconnected first voids are formed in the outer cylinder and the second bottom plate portion, wherein said forming the inner cylinder and the connection portion is performed such that interconnected second voids are formed in the inner cylinder and the connection portion, the second voids being smaller than the first voids, and wherein said forming the first bottom plate portion is performed such that non-interconnected minute voids are formed or no voids are formed in the first bottom plate portion.

3. The method according to claim 1, further comprising forming the first bottom plate portion by sintering a third portion of the plastic powder packed in the cavity in a third compression state, said forming being performed such that the voids in the first bottom plate are smaller than or equal to the voids in the inner cylinder and the voids in the connection portion.

4. The method according to claim 1, wherein said packing comprises packing only one type of the plastic powder in the cavity to form the plastic sintered body.

5. The method according to claim 2, wherein said packing comprises packing only one type of the plastic powder in the cavity to form the plastic sintered body.

6. The method according to claim 1, wherein said providing the metal mold comprises providing the metal mold such that the cavity of the metal mold is one continuous cavity.

7. The method according to claim 2, wherein said providing the metal mold comprises providing the metal mold such that the cavity of the metal mold is one continuous cavity.

* * * * *